(12) United States Patent
Nomichi et al.

(10) Patent No.: US 7,712,482 B2
(45) Date of Patent: May 11, 2010

(54) PRESSURE-REDUCING VALVE

(75) Inventors: Kaoru Nomichi, Ono (JP); Seiji Ishii, Ono (JP); Makoto Ninomiya, Kobe (JP)

(73) Assignee: Kabushiki Kaisha Kawasaki Precision Machinery, Kobe-shi (JP)

( * ) Notice: Subject to any disclaimer, the term of this patent is extended or adjusted under 35 U.S.C. 154(b) by 407 days.

(21) Appl. No.: 11/811,275

(22) Filed: Jun. 7, 2007

(65) Prior Publication Data

US 2008/0302428 A1     Dec. 11, 2008

(51) Int. Cl.
*G05D 16/02* (2006.01)
*G05D 16/10* (2006.01)

(52) U.S. Cl. .............................. 137/505.18; 137/505.28

(58) Field of Classification Search ............ 137/505.18, 137/505.25, 505.28
See application file for complete search history.

(56) References Cited

U.S. PATENT DOCUMENTS

| | | | | |
|---|---|---|---|---|
| 3,298,392 | A * | 1/1967 | Wilcox ................... | 137/505.25 |
| 3,360,004 | A * | 12/1967 | Lewis et al. ............ | 137/505.25 |
| 3,522,818 | A | 8/1970 | Leszek | |
| 3,926,208 | A * | 12/1975 | Hoffman ............... | 137/505.18 |
| 4,438,980 | A * | 3/1984 | Lippiatt ................... | 137/102 |
| 6,851,447 | B1 * | 2/2005 | Carroll ................... | 137/505.25 |
| 2004/0231727 | A1 * | 11/2004 | Nomichi et al. ......... | 137/505.25 |

FOREIGN PATENT DOCUMENTS

JP       2003-150249       5/2003

* cited by examiner

*Primary Examiner*—Stephen Hepperle
(74) *Attorney, Agent, or Firm*—Alleman Hall McCoy Russell & Tuttle LLP (57) ABSTRACT

A pressure-reducing valve includes a housing, a pressure-reducing piston, a driving piston, and a spring mechanism. The housing is provided with a primary port and a secondary port. The pressure-reducing piston is displaceably retained in an interior of the housing. The pressure-reducing piston is displaced to control an opening degree of the primary port and configured to separate the interior of the housing into a primary-pressure space connected to the primary port and a secondary-pressure space connected to the secondary port. The driving piston is displaceably retained in the interior of the housing. The driving piston is displaced to cause the pressure-reducing piston to be displaced in association therewith and has a secondary-pressure receiving surface that receives a secondary pressure from a fluid in the secondary-pressure space. The spring mechanism is configured to exert a spring force against the secondary pressure to at least one of the pistons.

2 Claims, 8 Drawing Sheets

PRIOR ART

FIG. 8

PRESSURE-REDUCING VALVE

TECHNICAL FIELD

The present invention relates to a pressure-reducing valve provided in a hydraulic apparatus, for example.

BACKGROUND ART

Figure 8:
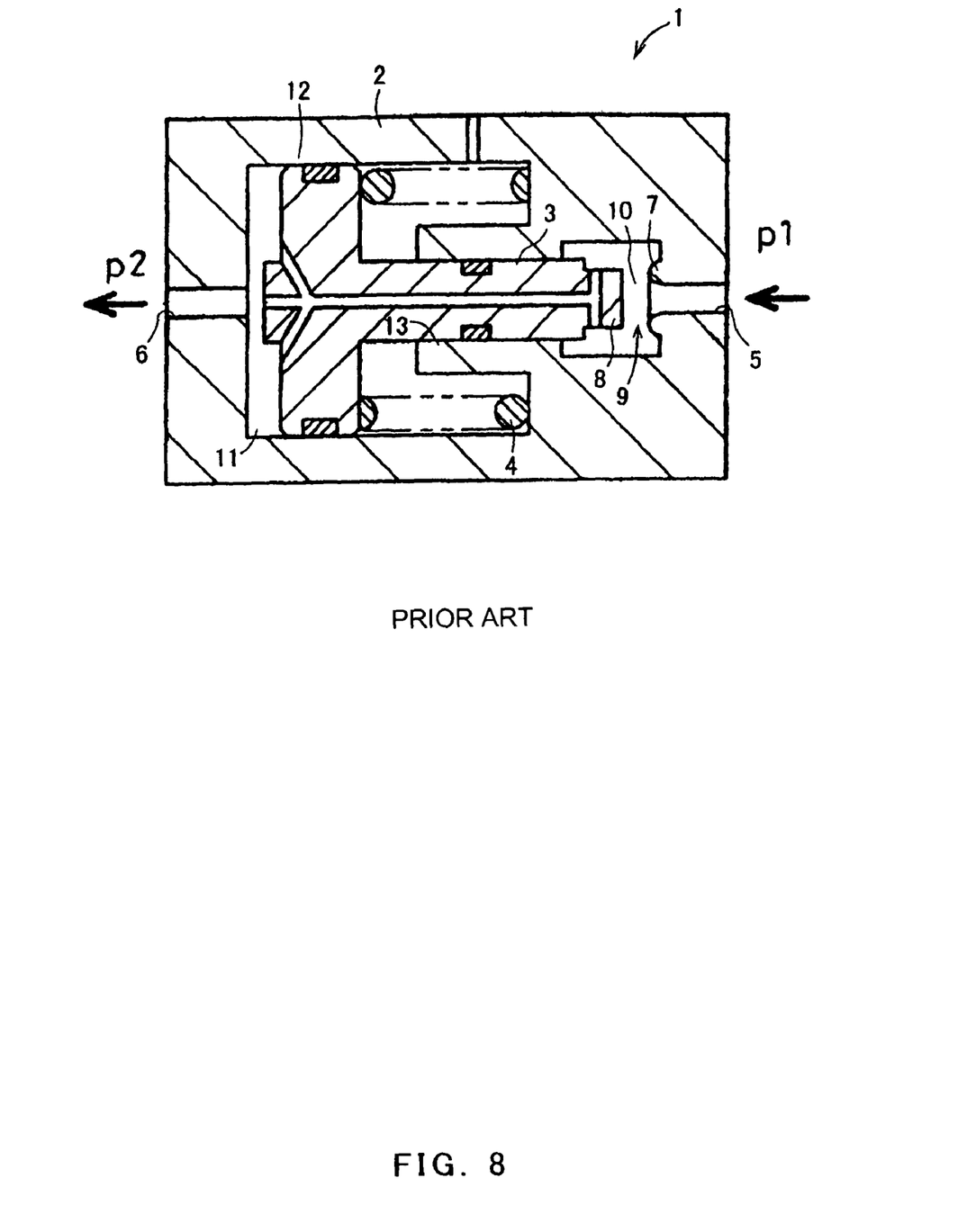
FIG. 8 is a cross-sectional view schematically showing a pressure-reducing valve according to a prior art.

FIG. 8 is a cross-sectional view schematically showing a pressure-reducing valve 1 according to prior art disclosed in Japanese Laid-Open Patent Application Publication No. 2003-150249. The pressure-reducing valve 1 includes a housing 2, a piston 3, and a spring member 4. In the interior of the housing 2, the piston 3 is axially displaceably mounted. In the interior of the housing 2, the piston 3 is axially elongated and is retained at an axial end portion and at an intermediate axial portion. The spring member 4 applies a spring force to the piston 3 along the axis of the piston. The housing 2 is provided with a primary port 5 and a secondary port 6. A protrusion 7 is formed to surround the outer periphery of the primary port 5. The protrusion 7 and a seat portion 8 of the piston 3 that is opposite to the protrusion 7 forms an orifice 9 for reducing pressure. The orifice 9 separates the interior of the housing 2 into a primary-pressure space 10 connected to the primary port 5 and a secondary-pressure space 11 connected to the secondary port 6. The pressure-reducing valve 1 reduces a primary pressure p1 of fluid supplied to the primary port 5 to a secondary pressure p2 by passing it through the orifice 9, and outputs the resulting fluid from the secondary port 6.

Since the prior art pressure-reducing valve 1 is constructed such that the elongated piston 3 is retained at the first axial end portion and at the intermediate axial portion, the following two problems arise.

First, if retaining portions 12 and 13 for retaining the first axial end portion and the intermediate axial portion of the piston 3 are disposed coaxially with low precision, then a non-uniform contact surface pressure is applied to the piston 3 in the circumferential direction. To be specific, the piston 3 is retained in an uneven contact condition in the interior of the housing 2. Thereby, an undesired friction force is applied to the piston 3, causing hysteresis to be generated in a pressure-reducing characteristic. The hysteresis of the pressure-reducing characteristic increases as the friction force applied to the piston 3 increases, making it difficult to control the pressure-reducing valve 1.

Second, to solve the above stated problem, it is necessary to improve the precision with which the retaining portions 12 and 13 are disposed coaxially. In order to improve the precision with which the retaining portions 12 and 13 are disposed coaxially, it is necessary to improve processing precision of the housing 2, i.e., decrease a coaxial tolerance. This leads to increased cost necessary to manufacture the housing 2. As a result, it becomes difficult to manufacture the pressure-reducing valve 1 in large quantities.

SUMMARY OF THE INVENTION

The present invention has been developed to solve the above stated problems, and an object of the present invention is to provide a pressure-reducing valve that can be easily controlled and can be manufactured at a lower cost.

According to the present invention, there is provided a pressure-reducing valve comprising a housing provided with a primary port and a secondary port; a pressure-reducing piston displaceably retained in an interior of the housing, the pressure-reducing piston being displaced to control an opening degree of the primary port and being configured to separate the interior of the housing into a primary-pressure space connected to the primary port and a secondary-pressure space connected to the secondary port; a driving piston displaceably retained in the interior of the housing, the driving piston being displaced to cause the pressure-reducing piston to be displaced in association therewith and having a secondary-pressure receiving surface that receives a secondary pressure, from a fluid in the secondary-pressure space; and a spring mechanism configured to exert a spring force against the secondary pressure to displace at least one of the pressure-reducing piston and the driving piston.

In accordance with the pressure-reducing valve constructed above, the fluid inflowing from the primary port flows into the secondary-pressure space through the primary-pressure space. The driving piston receives on its secondary-pressure receiving surface, the secondary pressure from the fluid flowing into the secondary-pressure space. When the secondary pressure becomes larger than the spring force exerted by the spring mechanism, the driving piston is displaced in the interior of the housing. The pressure-reducing piston is displaced in association with the displacement of the driving piston to control the opening degree of the primary port. By controlling the opening degree of the primary port, the flow rate of the fluid flowing from the primary-pressure space to the secondary-pressure space is controlled and thus the secondary pressure of the fluid output from the secondary port is reduced. In this manner, the driving piston having the secondary-pressure receiving surface for receiving the secondary pressure and the pressure-reducing piston for controlling the opening degree of the primary port are separately manufactured.

The pressure-reducing valve may further comprise a rod displaceably inserted into the pressure-reducing piston and being configured to form a back-pressure space kept at a primary pressure between the rod and the pressure-reducing piston with the rod inserted into the pressure-reducing piston; and a base rod retained in the housing, for applying a pressing force against the primary pressure applied to the rod to support the rod.

In accordance with the pressure-reducing piston, the back-pressure space kept at the primary pressure is formed between the rod and the pressure-reducing piston. A primary pressure from the fluid in the back-pressure space is applied to the pressure-reducing piston in an opposing direction against the primary pressure from the fluid in the primary-pressure space that is applied to the pressure-reducing piston. The base rod applies the pressing force against the primary pressure applied to the rod and supports the rod. Thus, the back-pressure space kept at the primary pressure can be formed. In addition, the rod inserted into the pressure-reducing piston and the base rod provided in the housing are separately manufactured.

In the pressure-reducing valve, the base rod may have a partial spherical support surface on which the rod is supported.

In accordance with the pressure-reducing valve constructed above, the support surface of the base rod on which the rod is supported is of a partial spherical shape. Thereby, the base rod supports the rod without uneven contact of the support surface with respect to the rod even when the base rod supports the rod with the base rod inclined with respect to the rod.

The above and further objects and features of the invention will more fully be apparent from the following detailed description with accompanying drawings.

DETAILED DESCRIPTION OF THE PREFERRED EMBODIMENTS

Now, embodiments of the present invention will be described with reference to the accompanying drawings. Throughout the embodiments, the same reference numbers or symbols are used to identify the same or corresponding components, which will not be described repetitively. When only a part of the components is described, it is described on the premise that the other parts are the same as those previously described. In addition to the combination described in each embodiment, the embodiments may be partially combined so long as no problems arise in such partial combination.

Embodiment 1

Figure 1:
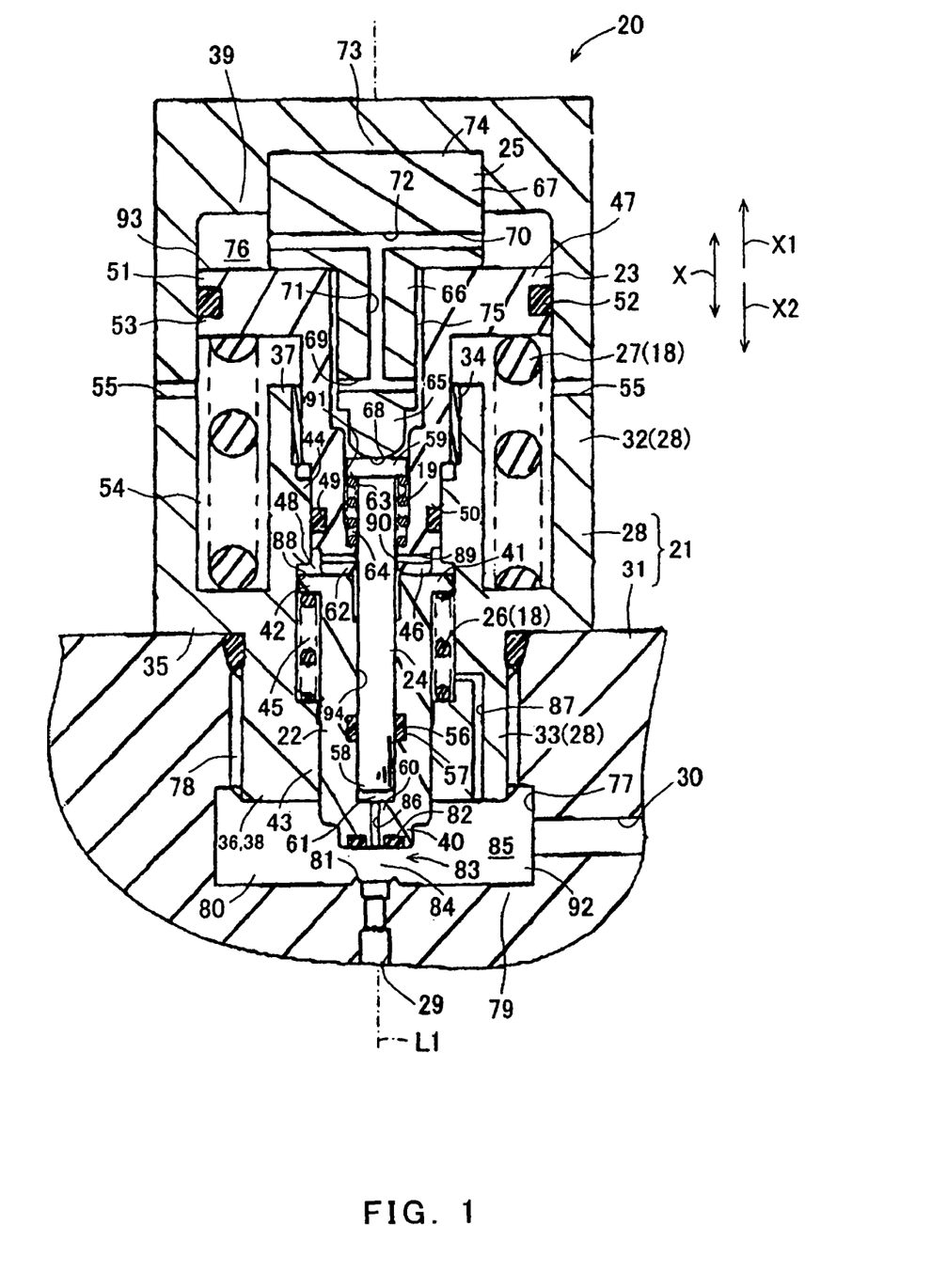
FIG. 1 is a cross-sectional view of a pressure-reducing valve according to a first embodiment of the present invention.
Figure 2:
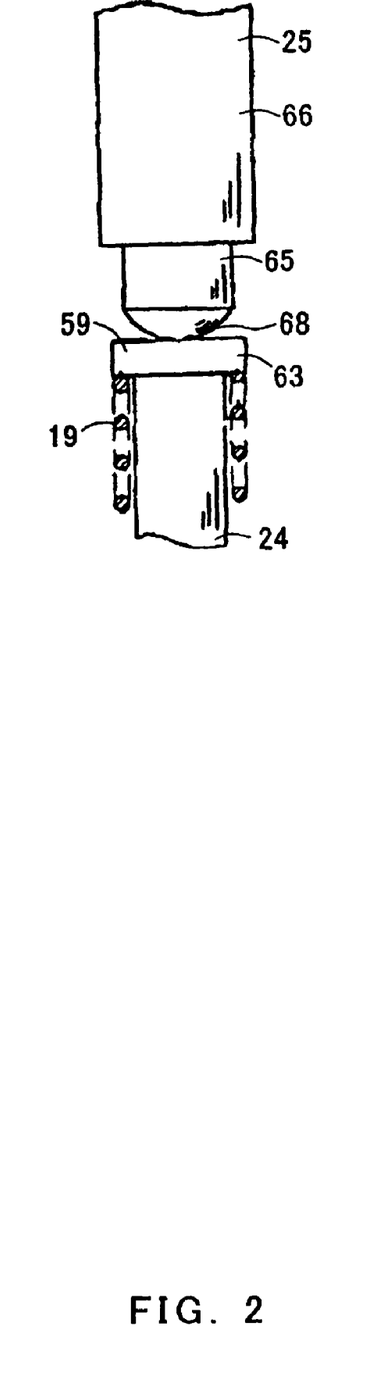
FIG. 2 is an enlarged view of a rod and a base rod of the pressure-reducing valve of FIG. 1.

FIG. 1 is a cross-sectional view of a pressure-reducing valve 20 according to a first embodiment of the present invention. FIG. 2 is an enlarged view of a rod 24 and a base rod 25. The pressure-reducing valve 20 is provided in a passage through which a fluid flows from a primary side to a secondary side and is configured to reduce a primary pressure p1 of supplied fluid to a secondary pressure p2 lower than the primary pressure p1, and to output the resulting fluid from the secondary port 6. The pressure-reducing valve 20 includes a housing 21, a pressure-reducing piston 22, a driving piston 23, the rod 24, the base rod 25, a first spring member 26, a second spring member 27, and a third spring member 19. The housing 21, the pressure-reducing piston 22, the driving piston 23, the rod 24, the base rod 25, the first spring member 26, the second spring member 27, and the third spring member 19 may be formed on different axes because of design and processing errors. For example, because of the errors produced by forming these elements within a predetermined coaxial tolerance, their axes may be displaced from each other and thus the elements may be formed on different axes which are displaced from an axis L1 of the pressure-reducing valve 20. Hereinbelow, for ease of explanation, description will be made on assumption that these elements are coaxially arranged, and their axes are coaxial with the axis L1 of the pressure-reducing valve 20. The same applies to the other embodiments.

The housing 21 includes a first housing 28 for retaining the pressure-reducing piston 22, the driving piston 23, the rod 24, and the base rod 25, and a second housing 31 provided with a primary port 29 and a secondary port 30. The first housing 28 is of a substantially bottomed cylindrical shape, and includes a bottomed cylindrical body portion 32, a substantially cylindrical base portion 33, and a cylindrical guide bushing 34. As used herein the term "bottomed" refers to a shape that at least partially encloses a void, and which has a bottom formed at least partially across a bottom of the void. The body portion 32, the base portion 33, and the guide portion 34 are coaxially arranged. The axes of these elements are coaxial with the axis L1 of the pressure-reducing valve 1. The base portion 33 includes opposed axial end portions, respectively referred to as a first axial end portion 36 and a second axial end portion 37, and an intermediate axial portion located therebetween. The base portion 33 is provided with an outward convex portion 35, which may be formed as a flange-shaped convex portion at the intermediate axial portion so as to protrude radially outward and so as to extend over the entire circumference. The outer periphery of the outward convex portion 35 is connected to an opening end portion of the body portion 32. In the first housing 28 constructed above, the first axial end portion 36 of the base portion 33 opens outward of the first housing 28, and the second axial end portion 37 of the base portion 33 opens inward of the first housing 28 As defined hereinbelow, first axial direction X1 is a direction from the opening end portion 38 which is the first axial end portion of the first housing 28 toward a bottom portion 39 which is the second axial end portion of the first housing 28 and the second axial direction X2 is an opposite axial direction from the bottom portion 39 to the opening end portion 38 of the first housing 28.

The pressure-reducing piston 22 is of a substantially bottomed cylindrical shape. A bottom portion of the pressure-reducing piston 22, which is located on first axial end portion 40 side, protrudes from the first axial end portion 36 in the second axial direction X2, and the remaining portion is inserted into the base portion 33. The pressure-reducing piston 22 is provided with a flange-shaped pressure-reducing piston convex portion 42 that is formed at a second axial end portion 41 which is an opening end portion. The pressure-reducing piston convex portion 42 protrudes radially outward and extends over the entire circumference. The pressure-reducing piston 22 is retained to be displaceable in the axial direction X within the first housing 28 with a part of it inserted into the base portion 33.

The base portion 33 of the first housing 28 is provided with a flange-shaped guide portion 43 that is formed at the first axial end portion 36 thereof so as to protrude radially inward and to extend over the entire circumference. A flange-shaped base portion inward convex portion 44 is formed at a portion of an intermediate axial end portion of the base portion 33 that is located closer to the second axial end portion 37 so as to be spaced apart from the guide portion 43 in the axial direction X. The base portion inward convex portion 44 protrudes radially inward and extends over the entire circumference. The pressure-reducing piston 22 is configured such that an outer peripheral region of a portion of the intermediate axial portion that is located closer to the first axial end portion 40 is retained on an inner peripheral portion of the guide 43 so as to be displaceable in the axial direction X. The pressure-reducing piston convex portion 42 has an outer peripheral portion with a diameter smaller than that of an inner peripheral portion of a portion between the guide portion 43 of the base portion 33 and the base portion inward convex portion 44 of the base portion 33. The pressure-reducing piston convex portion 42 of the pressure-reducing piston 22 is disposed between the guide portion 43 and the base portion inward convex portion 44 of the piston 33.

The pressure-reducing piston 22 and the base portion 33 are disposed to be radially spaced apart from each other between the pressure-reducing piston convex portion 42 and the guide portion 43, thereby forming a first annular spring accommodating space 45 between the pressure-reducing piston convex portion 42 and the guide portion 43. A first spring member 26 which is a compressive spring is accommodated in the first spring accommodating space 45. The first spring member 26 is externally fitted to a part of the pressure-reducing piston 22. The first axial end portion of the first spring member 26 is supported on the guide portion 43 and the second axial end portion thereof is supported on the pressure-reducing piston convex portion 42.

The driving piston 23 is substantially cylindrical. A portion of the driving piston 23 that is located on first axial end portion 46 side is inserted into the base portion 33, and a portion of the driving piston 23 that is located on second axial end portion 47 side protrudes from the second axial end portion 37 of the base portion 33 in the first axial direction X1. With the driving piston 23 inserted into the base portion 33, the first axial end portion 46 of the driving piston 23 is in contact with the second axial end portion 41 of the pressure-reducing piston 22. The first spring member 26 applies a spring force to the pressure-reducing piston 22 in the first axial direction X1, causing the second axial end portion 41 to be in contact with the first axial end portion 46 of the driving piston 23. In this state, the driving piston 23 is retained to be displaceable in the axial direction X within the first housing 28.

The driving piston 23 is configured such that the outer peripheral portion of the first axial end portion 46 is recessed inward in step shape over the entire circumference. Thus formed, the first axial end portion 46 of the driving piston 23 and the base portion 33 are spaced apart from each other. Thus, an annular base portion inner space 48 is formed between the first axial end portion 46 of the driving piston 23 and the base portion 33. A first seal concave portion 50 that is recessed radially inward is formed on the outer peripheral portion of a region of the intermediate axial portion of the driving piston 23 that is located closer to the first axial end portion 46 to fit an annular seal member 49 therein. The annular seal member 49 is fitted into the first seal concave portion 50. The driving piston 23 is inserted into the base portion 33 in such a manner that a seal is formed between the outer peripheral portion of a region of the intermediate axial portion that is located closer to the first axial end portion 46 and the inner peripheral portion of the inward convex portion 43 of the base portion 33.

The cylindrical guide bushing 34 is internally fitted to the inner peripheral portion of the second axial end portion 37 of the base portion 33. The guide bushing 34 is retained on the base portion 33 such that its first axial end portion is supported on the base portion inward convex portion 44 of the base portion 33. The driving piston 23 is configured such that the outer peripheral portion of the intermediate axial portion is retained on the inner peripheral portion of the guide bushing 34 to be displaceable in the axial direction X.

A flange-shaped driving piston convex portion (driving piston convex portion) 51 is formed on the second axial end portion 47 of the driving piston 23 so as to protrude radially outward and extend over the entire circumference. A second seal concave portion 53 that is recessed inward is formed on the outer peripheral region of the driving piston convex portion 51 to fit an annular seal member 52 therein. The annular seal member 52 is fitted into the second seal concave portion 53. The outer peripheral portion of the driving piston convex portion 51 is inserted into the outer peripheral portion of the region of the intermediate axial portion 32 of the body portion that is located closer to the bottom portion 39. The driving piston convex portion 52 and the outer peripheral portion are sealed by the seal member 52 fitted into the second seal concave portion 53.

The inner peripheral portion of the body portion 32 and the outer peripheral portion of the base portion 33 are formed to be radially spaced apart from each other between the driving piston convex portion 51 and the outward convex portion 35. Thus, an annular second spring accommodating space 54 is formed between the driving piston convex portion 51 and the outward convex portion 35. The second spring accommodating space 54 opens in atmosphere through an atmosphere opening hole 55 formed to penetrate radially through the outer peripheral portion of the body portion 32. The second spring member 27 which is a compressive spring is accommodated in the second spring accommodating space 54. The second spring member 27 is externally fitted to a part of the outer peripheral portion of the base portion 32 that is located on the second axial end portion 37 side. The first axial end portion of the second spring member 27 is supported on the outward convex portion 35 and the second axial end portion thereof is supported on the driving piston convex portion 51. The second spring member 27 and the first spring member 26 form a spring mechanism 18. While in the illustrated embodiment the spring mechanism 18 includes two springs, it will be appreciated that the spring mechanism may alternatively include one spring, or more than two springs.

A seal concave portion 57 that is recessed radially outward and extends over the entire circumference is formed on the inner peripheral portion of the intermediate axial portion of the pressure-reducing piston 22 to fit the annular seal member 56 therein. The annular seal member 56 is fitted into the seal concave portion 57. A portion of the rod 24 of a substantially cylindrical shape that is located on the first axial end portion 58 side is inserted into the pressure-reducing piston 22. A portion of the rod 24 that is located on the second axial end portion 59 side protrudes in the first axial direction X1 from the second axial end portion 41 of the pressure-reducing piston 22. In this state, the rod 24 is inserted into the pressure-reducing piston 22 to be displaceable in the axial direction X. The rod 24 and the pressure-reducing piston 22 are sealed by the seal member 56. A back-pressure space 61 is formed between the first axial end portion 58 of the rod 24 and the bottom portion 60 of the pressure-reducing piston 22.

An inward convex portion 62 is formed on the first axial end portion 46 of the driving piston 23 so as to protrude radially inward and to extend over the entire circumference. The inner peripheral portion of the convex portion 62 has a diameter larger than that of the outer peripheral portion of the rod 24. The portion of the rod 24 that is located on the second axial end portion 59 side is inserted into the portion of the driving piston 23 that is located on the first axial end portion 46 side. In this way, the rod 24 is inserted into the driving piston 23 and the pressure-reducing piston 22, and the outer peripheral portion of the portion of the rod 24 that is located on the first axial end portion 58 side is displaceably retained on the inner peripheral portion of the pressure-reducing piston 22.

A flange-shaped rod convex portion 63 is formed on the second axial end portion 59 of the rod 24 so as to protrude radially outward and to extend over the entire circumference. The outer peripheral portion of the rod convex portion 63 is insertable into the inner peripheral portion of the driving piston 23. Between the rod convex portion 63 and the inward convex portion 62, the rod 24 and the driving piston 23 are radially spaced apart from other. Thus, a third annular spring accommodating space 64 is formed between the rod convex portion 63 and the inward convex portion 62. A third spring member 19 which is a compressive spring is accommodated in the third spring accommodating space 64. The third spring member 19 is externally fitted to a part of the outer peripheral portion of the rod 24. The first axial end portion of the third spring member 19 is supported on the inward convex portion 62, and the second axial end portion thereof is supported on the inward convex portion 59. The third spring member 19 applies a spring force to the rod 24 in the first axial direction X1.

The base rod 25 is substantially cylindrical, and has a small-diameter portion 65, a intermediate-diameter portion 66, and a large-diameter portion 67. The small-diameter portion 65 has a partial spherical support surface 68 which is a surface of first axial end portion thereof. The first axial end portion of the intermediate-diameter portion 66 is connected to the second axial end portion of the small-diameter portion 65. The first axial end portion of the large-diameter portion 67 is connected to the second axial end portion of the intermediate-diameter portion 66. The small-diameter portion 65 has a diameter smaller than that of the intermediate-diameter portion 66. The intermediate-diameter portion 66 has a diameter smaller than that of the large-diameter portion 67. The small-diameter portion 65, the intermediate-diameter portion 66, and the large-diameter portion 67 are integral with each other and are coaxial with each other.

A first hole 69 is formed on a portion on the first axial end portion side of the intermediate-diameter portion 66 to radially penetrate therethrough. A second hole 70 is formed on a portion on the first axial end portion side of the large-diameter portion 67 to radially penetrate therethrough. A third hole 71 is formed on the intermediate-diameter portion 66 and the large-diameter portion 67 to penetrate therethrough along the axis L1. Through the third hole 71, the first hole 69 and the second hole 70 are connected to each other. The first hole 69, the second hole 70, and the third hole 71 form a hole 72.

A fitting concave portion 73 that is recessed in the first axial direction X1 is formed at the bottom portion 39 of the body portion 66 to fit the second axial end portion 74 of the large-diameter portion 67 therein. The base rod 25 is retained in such a manner that the second axial end portion 74 of the large-diameter portion 67 is fitted into the fitting concave portion 73, and the remaining portion protrudes from the fitting concave portion 73 in the second axial direction X2. The base rod 25 is constructed such that the intermediate-diameter portion 66 is insertable into the driving piston 23, and the small-diameter portion 65 and the intermediate-diameter portion 66 are insertable into the driving piston 23. The large-diameter portion 67 of the base rod 25 has a diameter larger than that of the inner peripheral portion of the driving piston 23 and protrudes in the first axial direction X1.

The support surface 68 of the small-diameter portion 65 is curved in a convex shape in the second axial direction X2 to form a partial spherical shape. The support surface 68 of the small-diameter portion 65 is in contact with the second axial end portion 59 of the rod 24. The third spring member 19 applies a spring force to the rod 24 in the first axial direction X1 to cause the rod 24 to be in contact with the support surface 68. The small-diameter portion 65 and the intermediate-diameter portion 66 are radially spaced apart from the driving piston 23. Thus, an annular driving piston inner space 75 is formed between the small-diameter portion 65 and the intermediate-diameter portion 66, and the driving piston 23. The driving piston inner space 75 is connected to the second hole 69.

The first axial end portion of the large-diameter portion 67 protrudes in the second axial direction X2 from the fitting concave portion 73. The outer peripheral portion of the first axial end portion of the large-diameter portion 67 is placed to be able to contact the inner peripheral portion of the second axial end portion 47 of the driving piston 23. The second spring member 27 applies a spring force to the driving piston 23 in the first axial direction X1. The large-diameter portion 67 causes the bottom portion 39 of the body portion 32 and the outer peripheral portion of the opposite first axial end portion 47 of the driving piston 23 to be axially spaced apart from each other. Thus, an annular secondary space 76 is formed between the bottom portion 39 of the body portion 32 and the outer peripheral portion of the second axial end portion 47 of the driving piston 23. The secondary space 76 is connected to the third hole 71. The secondary space 76 and the driving piston inner space 75 are connected to each other through the hole 72.

A cylindrical concave portion 77 that is recessed in the second axial direction X2 is formed on the second housing 31. The portion of the base portion 33 that is located on the first axial end portion 36 side is threadedly inserted into a concave portion 78 forming the concave portion 77. The portion of the base portion 33 that is located on the first axial end portion 40 side is threaded into the concave portion 78 in a sealed state over the entire circumference. The bottom portion 79 of the concave portion 78 and the opening end portion 38 of the first housing 28 are faced to each other and are spaced apart from each other in the axial direction X threadedly engaged with the first housing 28. Thus, a space 80 is formed between the bottom portion 79 of the concave portion 78 and the first axial end portion 40 of the first housing 28.

The primary port 29 is formed on the bottom portion 79 of the concave portion 78 in the second housing 31 so as to extend along the axis L1. The primary port 29 is connected to the space 80. The secondary port 30 is formed on the inner peripheral portion of the concave portion 78 and is connected to the space 80. An annular protrusion 81 is provided on the bottom portion 79 so as to protrude in a taper shape in the first axial direction X1. The protrusion 81 extends over the entire circumference to surround the outer periphery of the primary port 29. An annular seat portion 82 that is made of special resin is formed at the first axial end portion 40 of the pressure-reducing piston 22 to extend over the entire circumference. The seat portion 82 is faced to the protrusion 81 in the axial direction X. The seat portion 82 and the protrusion 81 form an annular orifice 83 extending over the entire circumference. The space 80 has two regions connected to each other through the orifice 83. To be specific, the space 80 includes a primary-pressure space 84 formed to be located radially inward of the orifice 83 and a secondary-pressure space 85 formed to be located radially outward of the orifice 83. The primary port 29 is connected to the primary-pressure space 84 and the secondary port 30 is connected to the secondary-pressure space 85.

A hole 86 is formed at the first axial end portion 40 of the pressure-reducing piston 22 to extend along the axis L1. Through the hole 86, the primary-pressure space 84 is connected to the back-pressure space 60. A communicating hole 87 is formed at a portion of the first housing 28 that is located on the first axial end portion 36 side of the base portion 33 so that the secondary-pressure space 85 and the first spring accommodating space 45 are connected to each other.

The pressure-reducing piston 22 is disposed within the base portion 33 in such a manner that the outer peripheral portion of the pressure-reducing piston convex portion 42 is radially spaced apart from the inner peripheral portion of the base portion 33. Thereby, a first annular gap 88 is formed between the outer peripheral portion of the pressure-reducing piston convex portion 42 and the inner peripheral portion of the base portion 33. Through the first gap 88, the first spring accommodating space 45 and the base portion inner space 48 are connected to each other. A hole 89 is formed at the first axial end portion 46 of the driving piston 23 to extend radially inward and outward.

The rod 24 is disposed within the driving piston 23 in such a manner that the outer peripheral portion thereof is radially spaced apart from the inner peripheral portion of the driving piston inward convex portion 62. Thus, a second annular gap 90 is formed between the outer peripheral portion of the rod 24 and the inner peripheral portion of the inward convex portion 62 so as to extend over the entire circumference. Through the hole 89, the second gap 90 is connected to the base portion inner space 48. The second gap 90 is connected to the third spring accommodating space 64. Therefore, the base portion inner space 48 is connected to the third spring accommodating space 64 through the hole 89 and the second passage 90. The rod 24 is disposed in such a manner that the outer peripheral portion of the rod convex portion 63 is radially spaced apart from the inner peripheral portion of the driving piston 23. Thus, a third annular gap 91 is formed between the outer peripheral portion of the rod convex portion 63 and the inner peripheral portion of the driving piston 23. Through the third gap 91, the third spring accommodating space 64 and the driving piston inner space 75 are connected to each other.

As described above, the primary-pressure space 84 is formed by the space located radially inward of the orifice 83 and is connected to the primary port 29. The secondary-pressure space 92 is formed by the secondary space 85 of the space 80, the communicating hole 87, the first spring accommodating space 45, the first gap 88, the base portion inner space 48, the hole 89, the second gap 90, the third spring accommodating space 64, the third gap 91, the pressure-reducing piston inner space 75, the hole 72 and the secondary space 76 and is connected to the secondary port 30. Through the hole 86, the primary-pressure space 84 and the back-pressure space 61 are connected to each other.

In the pressure-reducing valve 20, the pressure-reducing piston 22 separates the interior of the first housing 21 into the primary-pressure space 84 and the secondary-pressure space 92 which are connected to each other through the orifice 83. The fluid supplied to the primary port 29 flows from the primary-pressure space 84 to the secondary-pressure space 92 through the orifice 83, to be precise, to the secondary space 85. A part of the fluid flowing in the secondary space 85 is output through the secondary port 30, and the remainder flows to the secondary space 76 through the communicating hole 87, the first spring accommodating space 45, the first gap 88, the base portion inner space 48, the hole 89, the second gap 90, the third spring accommodating space 64, the third gap 91, the pressure-reducing piston inner space 75, and the through hole 72.

While the fluid is flowing through the orifice 83, the pressure of the fluid is decreased. In other words, by causing the fluid to flow from the primary-pressure space 84 to the secondary-pressure space 92 through the orifice 83, the pressure is reduced. Therefore, the fluid in the primary-pressure space 84 and in the back-pressure space 61 connected to the primary-pressure space 84 has the primary pressure p1 and the fluid in the secondary-pressure space 92 has the secondary pressure p2 lower than the primary pressure p1.

The driving piston 23 has a secondary-pressure receiving surface 93, which is a surface of the second axial end portion 47 and receives a thrust applied in the second axial direction X2 from the fluid with the secondary pressure p2 flowing in the secondary space 76. The secondary-pressure receiving surface 93 corresponds to a secondary-pressure receiving surface. When the thrust is larger than the spring force applied in the first axial direction X1 by the second spring member 27 and the first spring member 26, the driving piston 23 presses the pressure-reducing piston 23 and causes the guide bushing 34 to be slidably displaced in the second axial direction X2. The pressure-reducing piston 22 being pressed causes the guide portion 43 to be slidably displaced in the second axial direction X2 in association with the displacement of the driving piston 23. This narrows a gap in the axial direction X between the seat portion 82 and the protrusion 81. By thus narrowing the gap in the axial direction X between the seat portion 82 and the protrusion 81, the flow rate of the fluid flowing through the orifice 83 is decreased, and further the secondary pressure p2 becomes low.

When the thrust becomes smaller than the spring force applied in the first axial direction X1 by the second spring member 27 and the first spring member 26, the driving piston 23 is pushed up in the first axial direction X1 by the second spring member 27 and the pressure-reducing piston 22 is pushed up in the first axial direction X1 by the first spring member 26. This increases a gap in the first axial direction X1 between the seat portion 82 and the protrusion 81. As a result, a flow rate of the fluid flowing through the orifice 83 is increased, and thus the secondary pressure p2 is increased.

The rod 24 is applied, at the first axial end portion 58 thereof, with the primary pressure p1 applied in the first axial direction X1 from the fluid in the back-pressure space 61. The rod 24 is supported by the support surface 68 under the condition in which a pressing force against the primary pressure p1 is applied from the base rod 25 to the rod 24. Thus, the rod 24 is supported by the base rod 25 such that displacement of the rod 24 in the first axial direction X1 with respect to the housing 21 is restricted. This makes it possible to prevent the rod 24 from coming off from the pressure-reducing piston 25 while the back-pressure space 61 is kept at the primary pressure p1.

Hereinbelow, the operation and potential advantages of the pressure-reducing valve 20 of the first embodiment will be described. In accordance with the pressure-reducing valve 20 of the first embodiment, the pressure-reducing piston 22 is displaced in association with the displacement of the driving piston 23, and the driving piston 23 and the pressure-reducing piston 22 control the opening degree of the primary port 29 to control the flow rate of the fluid flowing from the primary-pressure space 84 into the secondary-pressure space 92, thereby reducing the secondary pressure of the fluid output from the secondary port 30. Since the driving piston 23 and the pressure-reducing piston 22 are separately manufactured, it is not necessary to manufacture the driving piston 23 and the pressure-reducing piston 22 coaxially with each other, so that the coaxial tolerance of the driving piston 23 and the pressure-reducing piston 22 can be made greater than that of the prior art pressure-reducing valve. So, the processing precision required for the housing 21 for retaining the driving piston 23 and the pressure-reducing piston 22 may be reduced as compared to that of the prior art pressure-reducing valve, and hence the housing 21 can be manufactured easily. This makes it possible to reduce the manufacturing cost of the pressure-reducing valve 20. Since the housing 21 can be manufactured easily, the pressure-reducing valve 20 can be easily manufactured in larger quantity.

Since the driving piston 23 and the pressure-reducing piston 22 are separately manufactured, the driving piston 23 and the pressure-reducing piston 22 can be made shorter than the piston 3 of the prior art pressure-reducing valve 1. In addition, uneven contact of the driving piston 23 and the pressure-reducing piston 22 with respect to the housing 21 can be suppressed. In other words, circumferential non-uniform frictional force applied to the driving piston 23 and the pressure-reducing piston 22 can be reduced as compared to the uneven contact of the piston 3 with respect to the housing 2. By reducing the circumferential non-uniform frictional force applied to the driving piston 23 and the pressure-reducing valve 22, hysteresis of the pressure-reducing characteristic of the pressure-reducing valve 20 can be made smaller than that of the prior art pressure-reducing valve.

For the above reasons, the pressure-reducing valve 20 can be easily controlled, and the manufacturing cost of the pressure-reducing valve 20 can be reduced.

By suppressing the uneven contact of the driving piston 23 and the pressure-reducing piston 22, uneven wear-out caused by the uneven contact of the seal members 49 and 52 can be suppressed while the pistons 22 and 23 are being displaced within the housing 21. This makes it possible for the seal members 49 and 52 to reliably achieve a seal, and prolong their lifetimes. Because a reliable seal is achieved, leakage of the high-pressure gas from the secondary-pressure space 92 and the back-pressure space 61 can be inhibited, even in cases where the pressure-reducing valve 20 is used under a high-pressure gas condition.

In addition, in accordance with the pressure-reducing valve 20 of this embodiment, the driving piston 23 is retained by the guide bushing 34 and the pressure-reducing piston 22 is retained by the guide portion 43. In contrast, the prior art piston 3 is displaceably retained by the guide bushing 34 and the guide portion 43. If the guide bushing 34 and the guide 43 have low precision in coaxiality, non-uniform contact surface pressure is applied to the piston 3 over the entire circumference, and therefore uneven contact of the piston 3 with respect to the housing 21 occurs. This causes problems such as uneven contact and uneven wear-out of the seal members 49 and 52. For this reason, in the prior art pressure-reducing valve 1 including the piston 3 in which the pressure-reducing piston 33 and the driving piston 23 are integral with each other, processing precision required for the housing 2 is high, because the guide bushing 34 and the guide portion 43 are unable to allow for a large coaxial tolerance.

In this embodiment, the driving piston 23 and the pressure-reducing piston 22 are separately manufactured. So, the driving piston 23 displaces the guide bushing 34 and the pressure-reducing piston 22 displaces the guide portion 43. Even in the case where the guide bushing 34 and the guide portion 43 have low precision in coaxiality, the pistons 22 and 23 displace the guide bushing 34 and the guide portion 43, respectively. So, the contact surface pressures of the pressure-reducing piston 22 and the driving piston 23 can be made uniform over the entire circumference, thus suppressing uneven contact of the pressure-reducing piston 22 and the driving piston 23 with respect to the housing 21. Therefore, the guide bushing 34 and the guide portion 43 can allow for greater coaxial tolerances than those of the prior art pressure-reducing valve 1, and the processing precision required for the housing 21 can be made lower that of the prior art pressure-reducing valve 1. So, the housing 21 can be manufactured easily. This makes it possible to reduce the manufacturing cost of the pressure-reducing valve 20. Since the housing 21 can be manufactured easily, the pressure-reducing valve 20 can be easily manufactured in larger quantities.

In addition, since the contact surface pressure can be made uniform over the entire circumference, uneven contact of the pressure-reducing piston 22 and the driving piston 23 with respect to the housing 21 can be inhibited. This enables the seal members 49 and 52 to keep good seal conditions without losing their seal functions. Since the pressure-reducing piston 22 and the driving piston 23 are separately manufactured in this way, they are slidably displaceable within the housing 21 in the state where the pressure-reducing piston 22 and the driving piston 23 retained by the guide bushing 34 and the guide portion 43, respectively. This makes it possible to reduce non-uniform frictional force applied in the circumferential direction to the pressure-reducing piston 22 and the driving piston 23, and thus to decrease the hysteresis of the pressure-reducing characteristic of the pressure-reducing valve 20.

In addition, in accordance with the pressure-reducing valve 20 of this embodiment, since the rod 24 and the base rod 25 are separately manufactured, they can allow for greater coaxial tolerances than those of the prior art pressure-reducing valve 1. So, the processing precision required for the pressure-reducing piston 22 for retaining the rod 24 may be reduced as compared to that of the prior art pressure-reducing valve 1, and hence the pressure-reducing valve 22 can be manufactured easily. This makes it possible to reduce the manufacturing cost of the pressure-reducing valve 20 if the back-pressure 61 space is formed between the pressure-reducing piston 22 and the rod 24. Since the pressure-reducing piston 22 can be manufactured easily, the pressure-reducing valve 20 can be easily manufactured in larger quantities.

Furthermore, since the rod 24 and the base rod 25 are separately manufactured, they can be made shorter than integral ones. This enables the contact surface pressure of the rod 24 with respect to the pressure-reducing piston 22 to be uniform over the entire circumference as compared to the construction in which the rod 24 and the base rod 25 are integral. Therefore, uneven contact of the rod 24 with respect to the pressure-reducing piston 22 can be suppressed. As a result, the non-uniform frictional force applied in the circumferential direction to the rod 24 can be reduced, and thus the hysteresis of the pressure-reducing characteristic of the pressure-reducing valve 20 can be made smaller as compared to the construction in which uneven contact of the rod 24 occurs.

In accordance with the pressure-reducing valve 20 of this embodiment, the rod 24 is inserted into the pressure-reducing piston 22, and the base rod 25 is retained in the fitting concave portion 73. Since the rod 24 and the base rod 25 are separately manufactured, the contact surface pressure of the rod 24 with respect to the pressure-reducing piston 22 can be made uniform over the entire circumference even in the case where the rod 24 and the base rod 25 have low precision in coaxiality. Thereby, uneven contact of the rod 24 with respect to the pressure-reducing piston 22 can be suppressed. Therefore, the rod 24 and the base rod 25 can have coaxial tolerances greater than those of the prior art pressure-reducing valve 1. So, the processing precision required for the housing 21 and the pressure-reducing piston 22 may be reduced as compared to that of the prior art pressure-reducing valve 1, and hence the pressure-reducing valve 22 can be manufactured easily. This makes it possible to reduce the manufacturing cost of the pressure-reducing valve 20 if the back-pressure 61 space is formed between the pressure-reducing piston 22 and the rod 24. Since the pressure-reducing piston 22 can be manufactured easily, the pressure-reducing valve 20 can be easily manufactured in larger quantities.

The rod 24 is in contact with the support surface 68 of the base rod 25 by the force applied by the third spring member 19. Thus, axial displacement of the rod 24 is restricted so that the rod 24 does not come off from the pressure-reducing piston 22. Since the rod 24 is retained in this way, occurrence of unwanted strange sound and friction which may be caused by the displacement of the rod 24 relative to the housing 21 can be suppressed.

In the case where the rod 24 and the base rod 25 are integral, the contact surface pressure of the portion of the rod 24 may be non-uniform over the entire circumference if the fitting concave portion 73 in which the base rod 25 is retained and the hole 94 into which the portion of the rod 24 is inserted have low precision in coaxiality. This causes the uneven contact of the rod 24 with respect to the pressure-reducing piston 22. Due to such uneven contact, the seal member 56 unevenly wears out and degrades its seal function, reducing its lifetime.

In accordance with the pressure-reducing valve 20 of this embodiment, since the rod 24 and the base rod 25 are separately manufactured, the rod 24 is inserted into the pressure-reducing piston 22 under the condition in which the contact surface pressure of the rod 24 with respect to the pressure-reducing piston 22 is uniform over the entire circumference even in the case where the fitting concave portion 73 and the hole 94 into which the rod 24 is inserted have lower precision in coaxiality as compared to the construction in which the rod 24 and the base rod 25 are integral with each other. Thereby, the rod 24 is slidably displaced in the axial direction X without uneven contact with the pressure-reducing piston 22. Thereby, the non-uniform frictional force applied in the circumferential direction to the rod 24 can be reduced, and thus the hysteresis of the pressure-reducing valve 20 can be decreased. Furthermore, the uneven wear-out of the seal member 56 is suppressed and a seal is reliably achieved. As a result, the lifetime of the seal member 56 can be increased.

In accordance with the pressure-reducing valve 20 of this embodiment, the support surface 68 of the base rod 25 is formed to have a partial spherical shape. For this reason, even when the axis of the base rod 25 is inclined with respect to the axis of the rod 24, the base rod 25 supports the rod 24 without the uneven contact of the base rod 25 with respect to the rod 24. Therefore, the contact surface pressure of the rod 24 with respect to the pressure-reducing piston 22 can be made uniform over the entire circumference. Thereby, the non-uniform frictional force applied in the circumferential direction to the rod 24 can be reduced, and thus the hysteresis of the pressure-reducing valve 20 can be decreased.

Embodiment 2

Figure 3:
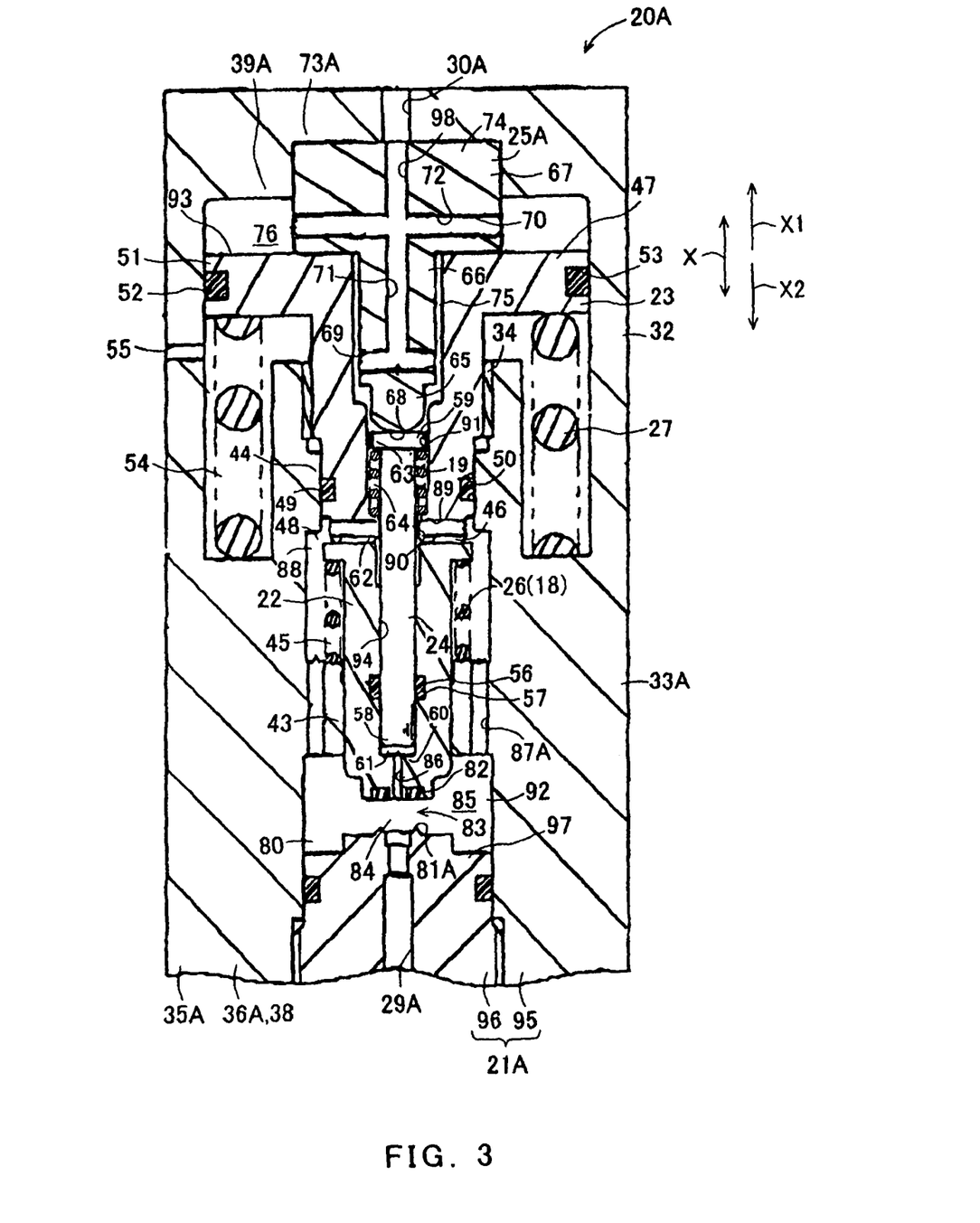
FIG. 3 is a cross-sectional view of a pressure-reducing valve according to a second embodiment of the present invention.

FIG. 3 is a cross-sectional view of a pressure-reducing valve 20A according to a second embodiment of the present invention. The pressure-reducing valve 20A is similar to the pressure-reducing valve 20 of the first embodiment. Therefore, the same reference numerals denote the same or corresponding parts, which will not be further described, and only the distinction between the first embodiment and the second embodiment will be described. The pressure-reducing valve 20A includes a housing 21A composed of a housing body 95 and a cap member 96. The housing body 95 and the cap member 96 are coaxial with each other, and their axes conform to an axis L1 of the pressure-reducing valve 20A. The housing body 95 is of a substantially bottomed cylindrical shape. The housing body 95 is formed by a body portion 32A and a base portion 33A. The body portion 32A is of a substantially bottomed cylindrical shape. A fitting concave portion 73A is formed on a bottom portion 39A of the body portion 32A to retain the base rod 25 therein. A secondary port 30A is formed on the bottom portion 39A so as to extend axially from the fitting concave portion 73A.

The base portion 33A is of a substantially cylindrical shape. A flange-shaped outward convex portion 35A is formed over a region from first axial end portion 36A to axial intermediate portion so as to protrude radially outward and over the entire circumference. The outward convex portion 35A is formed by connecting an opening end portion of the body portion 32A to the outer peripheral portion of the base portion 33A that is located on the second axial end portion 37 side. The cap member 96 is threaded into an opening end portion 36A which is the first axial end portion of the base portion 33A. The flange-shaped guide portion 43 is formed on the inner peripheral portion of the intermediate axial portion of the base portion 33A which is located closer to the first axial end portion 36A such that the guide portion 43 protrudes radially inward and extend over the entire circumference. The flange-shaped base portion inward convex portion 44 is formed on the inner peripheral portion of the intermediate axial portion of the base portion 33A which is located closer to the second axial end portion 37A such that the convex portion 44 protrudes radially inward and extend over the entire circumference. The guide bushing 34 is fitted and retained into the inner peripheral portion of the second axial end portion 37A of the base portion 33A.

The cap member 96 is of a substantially cylindrical shape. A primary port 29A is formed on the cap member 96 so as to extend along an axis thereof. An annular protrusion 81A is formed on first axial end portion 97 of the cap member 96 such that the annular protrusion 81A extends over the entire circumference to surround the outer periphery of the primary port 29A and protrudes in a taper shape in first axial direction. The protrusion 81A is disposed opposite to the seat portion 82 formed on the pressure-reducing piston 22 in the axial direction X. The protrusion 81A and the seat portion 82 form the annular orifice 83. The space 60 is formed between the housing body 95, and the cap member 96 and the pressure-reducing piston 22. To be specific, the space 60 includes the primary-pressure space 84 located radially inward of the orifice 83 and the secondary-pressure space 85 located radially outward of the orifice 83. The primary-pressure space 84 and the secondary space 85 are connected to each other through the orifice 83. To connect the secondary space 84 and the first spring accommodating space 45 to each other, a plurality of, for example, two communicating holes 87A are formed on the guide portion 43. The respective communicating holes 87A extend through the guide portion 43 in the axial direction X and are equally spaced apart from each other around the axis L1, for example, 180 degrees apart from each other. The outer peripheral portion of first axial end portion 97 of the cap member 96 is threaded into the inner peripheral portion of the opening end portion 38 of the housing 21A in a sealed state.

A fourth hole 98 is formed on the second axial end portion 74 of the base rod 25A to extend along the axis L1. Through the fourth hole 98, the third hole 71 and the secondary port 30A are connected to each other.

In the pressure-reducing valve 20A constructed above, as in the pressure-reducing valve 20 of the first embodiment, the fluid flowing in the primary port 29A passes through the orifice 83 where its pressure is reduced, and resulting fluid flows to the secondary-pressure space 92. The fluid flowing in the secondary-pressure space 92 is output from the secondary port 30A through the fourth hole 98. Therefore, as in the pressure-reducing valve 20 of the first embodiment, the fluid output from the primary port 29A, the fluid in the primary-pressure space 84 and the fluid in the back-pressure space 60 have the primary pressure p1, while the fluid in the secondary-pressure space 92 and the fluid output from the secondary port 30A have the secondary pressure p2. The operation of the pressure-reduced valve 20A is identical to that of the pressure-reducing valve 20 of the first embodiment, and therefore will not be further described.

Below, the potential advantages achieved by the pressure-reducing valve 20A of this embodiment will be described. In accordance with the pressure-reducing valve 20A of this embodiment, the third hole 71 and the fourth hole 98 extend from the second axial end portion 74 of the base rod 25A to the first hole 69. Since the third hole 71 and the fourth hole 98 are formed to extend from the second axial end portion 74 of the base rod 25A along the second axial direction X2, they can be easily formed without generating waste in manufacturing.

In addition, the pressure-reducing valve 20A of this embodiment is able to achieve the advantages as in the pressure-reducing valve 20 of the first embodiment.

Embodiment 3

Figure 4:
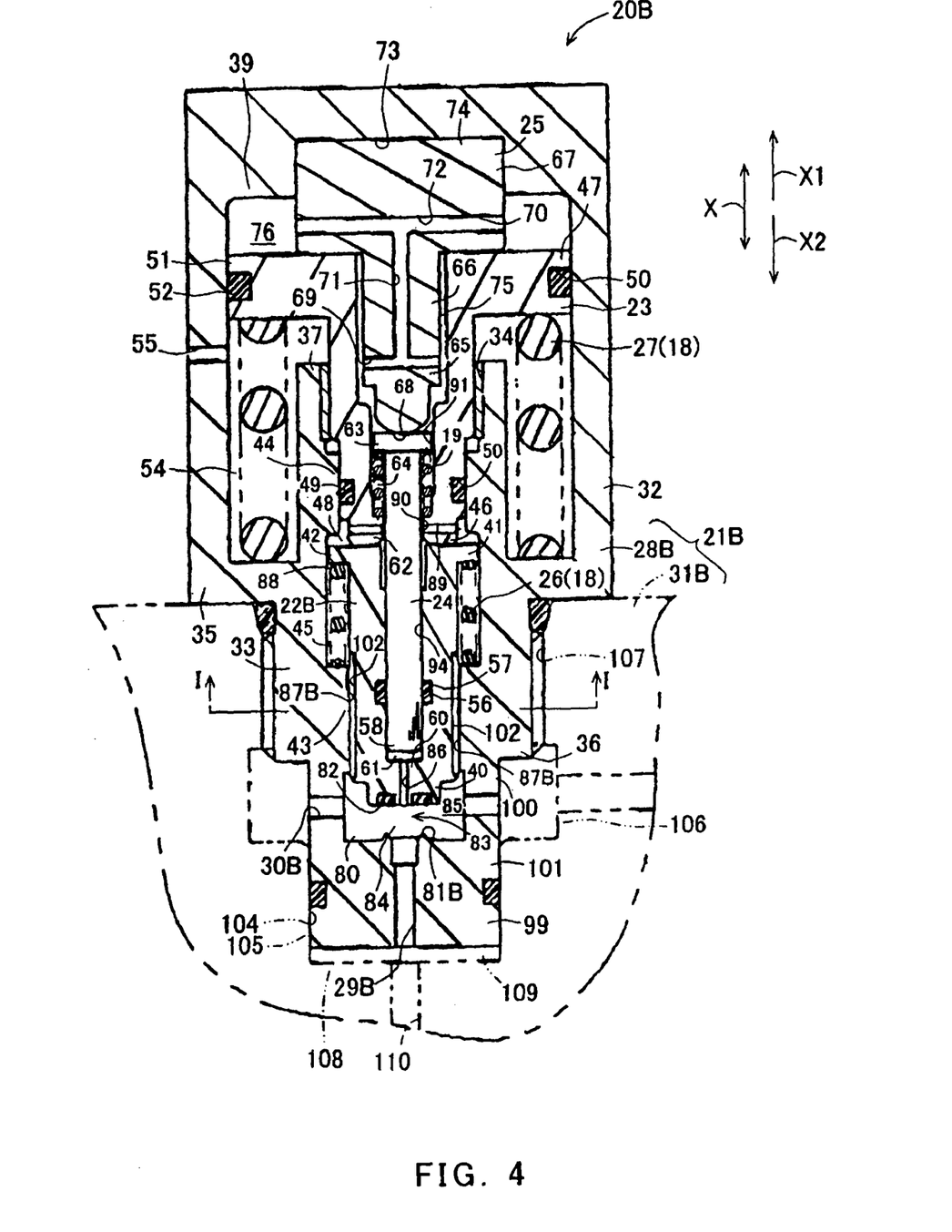
FIG. 4 is a cross-sectional view of a pressure-reducing valve according to a third embodiment of the present invention.
Figure 5:
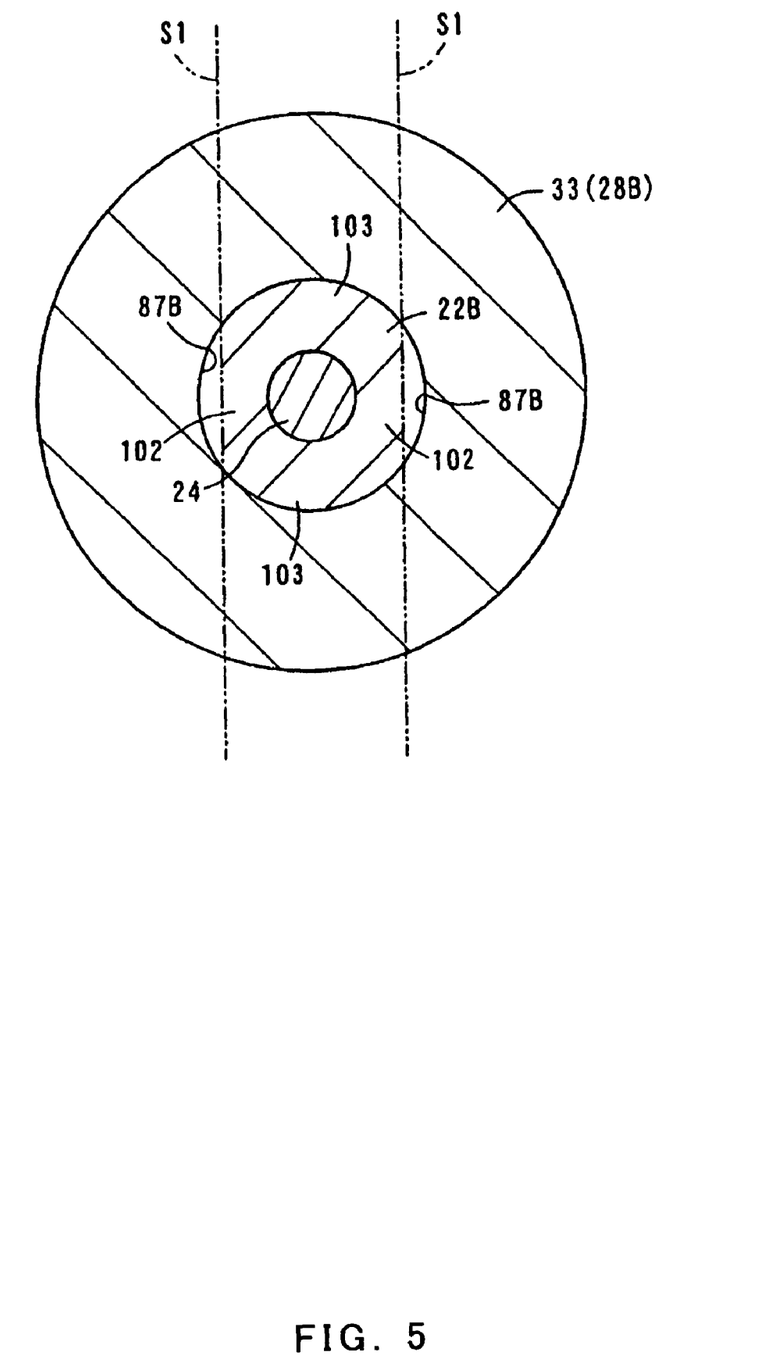
FIG. 5 is a cross-sectional view of a pressure-reducing piston taken along line I-I of FIG. 4.

FIG. 4 is a cross-sectional view of a pressure-reducing valve 20B according to a third embodiment of the present invention. FIG. 5 is a cross-sectional view of the pressure-reducing valve 20B taken along the like I-I of FIG. 4. The pressure-reducing valve 20B is similar to the pressure-reducing valve 20 of the first embodiment. Therefore, the same reference numerals denote the same or corresponding parts, which will not be further described, and only the distinction between the first embodiment and the third embodiment will be described. A first housing 28B has a bottomed cylindrical portion 99. The bottomed cylindrical portion 99, the body portion 32 and the base portion 33 are coaxially arranged, and their axes are coaxial with the axis L1 of the pressure-reducing valve 20B. An opening end portion 100 of the bottomed cylindrical portion 99 is connected to the first axial end portion 36 of the base portion 33. The bottomed cylindrical portion 99 protrudes from the first axial end portion 36 of the base portion 33 in the second axial direction X2. The inner peripheral portion of the bottomed cylindrical portion 99 has a diameter larger than that of the inner peripheral portion of the first axial end portion 36 of the base portion 33, i.e., the inner peripheral portion of the guide portion 43.

A primary port 29B is formed on a bottom portion 101 of the bottomed cylindrical portion 99 to extend through the axis L1. An annular protrusion 81B is provided on the bottom portion 101 such that protrusion 81B extends over the entire circumference to surround the outer periphery of the primary port 29B and protrudes in a taper shape in the first axial direction X1. In the pressure-reducing valve 22, the seat portion 82 is opposite to the protrusion 81B. The seat portion 82 and the protrusion 81B form the orifice 83. A plurality of secondary ports 30B are formed to extend radially inward and radially outward through the outer peripheral portion of the bottomed cylindrical portion 99. The respective secondary ports 30B are formed on the outer peripheral portion of the bottomed cylindrical portion 99 so as to be equally spaced apart in the circumferential direction, for example, 180 degrees spaced apart from each other. In this embodiment, two secondary ports 30B are formed on the outer peripheral portion of the bottomed cylindrical portion 99.

Inside the bottomed cylindrical portion 99 thus structured, the space 60 is formed. The space 60 includes the primary-pressure space 84 located radially inward of the orifice 83 and the secondary space 85 located radially outward of the orifice 83. The primary-pressure space 84 and the secondary space 85 are connected to each other through the orifice 83. The primary port 29B is connected to the primary-pressure space 84 and the secondary port 30B are connected to the secondary space 85.

The pressure-reducing piston 22B is of a substantially bottomed cylindrical shape. Two flat portions 102 are formed on the outer peripheral portion of the pressure-reducing piston 20B to extend from the first axial end portion 40 to the portion of intermediate axial portion that is located closer to the second axial end portion 41. The two flat portions 102 are parallel to the axis L1. In this embodiment, the two flat portions 102 are formed by cutting a region of the outer peripheral portion of the pressure-reducing piston 22B that is located radially outward relative to two imaginary planes SI perpendicular to the radial direction. The two imaginary planes SI are opposite to and parallel to each other. In this manner, the two flat portions 102 are formed on the outer peripheral portion of the pressure-reducing piston 22B to extend in parallel and a circular-arc portion 103 is formed on the remainder portion.

With the above structured pressure-reducing piston 20B inserted into the guide portion 43, the flat portions 102 of the pressure-reducing piston 20B are radially spaced apart from the inner peripheral portion of the guide portion 43, thereby forming a slit-shaped communicating hole 87B axially extending between the flat portions 102 of the pressure-reducing piston 20B and the inner peripheral portion of the guide portion 43. Through the communicating hole 87B, the secondary space 85 of the space 60 and the first spring accommodating space 45 are connected to each other.

A substantially cylindrical concave portion 104 that is recessed in the second axial direction X2 is formed on the second housing 31B. The concave portion 104 and the first housing 28B are coaxial with each other, and the axis of the concave portion 104 is coaxial with the axis L1 of the pressure-reducing valve 20B. The portion of the base portion 33 located on the first axial end portion 36 side and the bottomed cylindrical portion 99 are inserted into a concave portion 105 forming the concave portion 104 and the portion of the base portion 33 located on the first axial end portion 36 side is threaded into the concave portion 105. To be specific, the concave portion 105 is provided with a large-diameter portion 106 located at intermediate axial end portion, an intermediate-diameter portion 107 located at a portion on first axial end portion side which is an opening end portion thereof, and a small-diameter portion 108 located at a portion on the second axial end portion side which is a bottom portion thereof. The large-diameter portion 106 has a diameter larger than that of the intermediate-diameter portion 107. The intermediate-diameter portion 107 has a diameter larger than that of the small-diameter portion 108. The portion of the base portion 33 that is located on the first axial end portion 36 side is inserted and threaded with the intermediate-diameter portion 107 of the concave portion 105. The portion of the base portion 33 that is located on the first axial end portion 36 side is threaded with the intermediate-diameter portion 107 thus creating a seal formed between its outer peripheral portion and the intermediate-diameter portion 107 over the entire surface.

The small-diameter portion 108 of the concave portion 105 is formed to allow the bottom portion 101 of the bottomed cylindrical portion 99 to be insertable thereinto. The bottom portion 101 of the bottomed cylindrical portion 99 is inserted into the small-diameter portion 108 of the concave portion 105. The bottom portion 101 of the bottomed cylindrical portion 99 is inserted into the small-diameter portion 107 thus creating a seal formed between its outer peripheral portion and the small-diameter portion 107 over the entire circumference. In this state, the bottom portion of the small-diameter portion 107 and the bottom portion 101 of the bottomed cylindrical portion 99 are opposite to each other and spaced apart from each other in the axial direction X. A circular-plate shaped primary port communicating space 109 is formed between the small-diameter portion 107 and the bottomed cylindrical portion 99. The primary port communicating space 109 is connected to the primary port 29B. A first passage 110 is formed on the second housing 31B so as to extend along the axis L1 from the bottom portion of the small-diameter portion 107. The first passage 110 is connected to the primary port communicating space 109 and is connected to the primary port 29B through the primary port communicating space 109.

With the first housing 28B threaded into the concave portion 105, the inner peripheral portion of the large-diameter portion 106 and the outer peripheral portion of the port potion 99 are opposite (faced) to each other and radially spaced apart from each other. An annular secondary port accommodating space 111 is formed between the inner peripheral portion of the large-diameter portion 106 and the outer peripheral portion of the bottomed cylindrical portion 99. The secondary port communicating space 111 is connected to the secondary port 30B. A second passage 112 is formed in the second housing 31B so as to extend radially outward from the inner peripheral portion of the large-diameter portion 106. The second passage 112 is connected to the secondary port communicating space 111 and is connected to the secondary port 30B through the secondary port communicating space 111.

In the pressure-reducing valve 20B constructed above, the fluid flows from the first passage 110 to the secondary port 29B through the primary port communicating space 109. As in the pressure-reducing valve 20 of the first embodiment, the fluid flowing in the primary port 29B passes through the orifice 83 where its pressure is reduced, and resulting fluid is output from the secondary port 30A to the second passage 111 through the secondary port communicating space 111. The operation of the pressure-reduced valve 20B is identical to that of the pressure-reducing valve 20 of the first embodiment, and therefore will not be further described.

Below, the potential advantages achieved by the pressure-reducing valve 20B of this embodiment will be described. In accordance with the pressure-reducing valve 20B of this embodiment, the protrusion 81B, the primary port 29B, and the secondary port 30B are formed on the first housing 28B by forming the bottomed cylindrical portion (port portion) 99 on the base portion 33. Thereby, the pressure-reducing valve 20B can be disposed in the passage by merely threadedly engaging the first housing 28B with the second housing 30B. Since it is not necessary to form the protrusion 81B on the second housing 30B such as a gas tank, the second housing 29B can be easily manufactured, and general versatility is improved. As a result, the pressure-reducing valve 20B can be manufactured at a reduced cost and in larger quantities.

In accordance with the pressure-reducing valve 20B of this embodiment, the slit-shaped communicating hole 87B is formed between the outer peripheral portion of the pressure-reducing valve 20B and the outer peripheral portion of the guide portion 43. Through the communicating hole 87B, the secondary space 85 of the space 60 and the first spring accommodating space 45 are connected to each other. This eliminates a need to form in the base portion 33 a hole such as the communicating hole 87 of the pressure-reducing valve 20 of the first embodiment. Thereby, mechanical stiffness of the base portion 33, i.e., mechanical stiffness of the first housing 28B can be increased as compared to the pressure-reducing valve 20 of the first embodiment. Furthermore, the bottomed cylindrical portion 99 can be formed on the base portion 33 by increasing the mechanical stiffness of the base portion 33.

Since the bottomed cylindrical portion 99 provided with the primary port 29B and the secondary port 30B is formed integrally on the base portion 33, mechanical stiffness of the base portion 33 and the bottomed cylindrical portion 99 may be reduced if the communicating hole 87B is formed in the base portion 33 and the bottomed cylindrical portion 99. In addition, it is difficult to ensure a space in the bottomed cylindrical portion 99 to form the communicating hole 87B. According to this embodiment, by forming the communicating hole 87B between the outer peripheral portion of the pressure-reducing piston 22 and the inner peripheral portion of the guide portion 43, the mechanical stiffness is not reduced and the space is ensured, so that the primary port 29B, the secondary port 30B, and the protrusion 81B can be formed on the first housing 28B.

Figure 6:
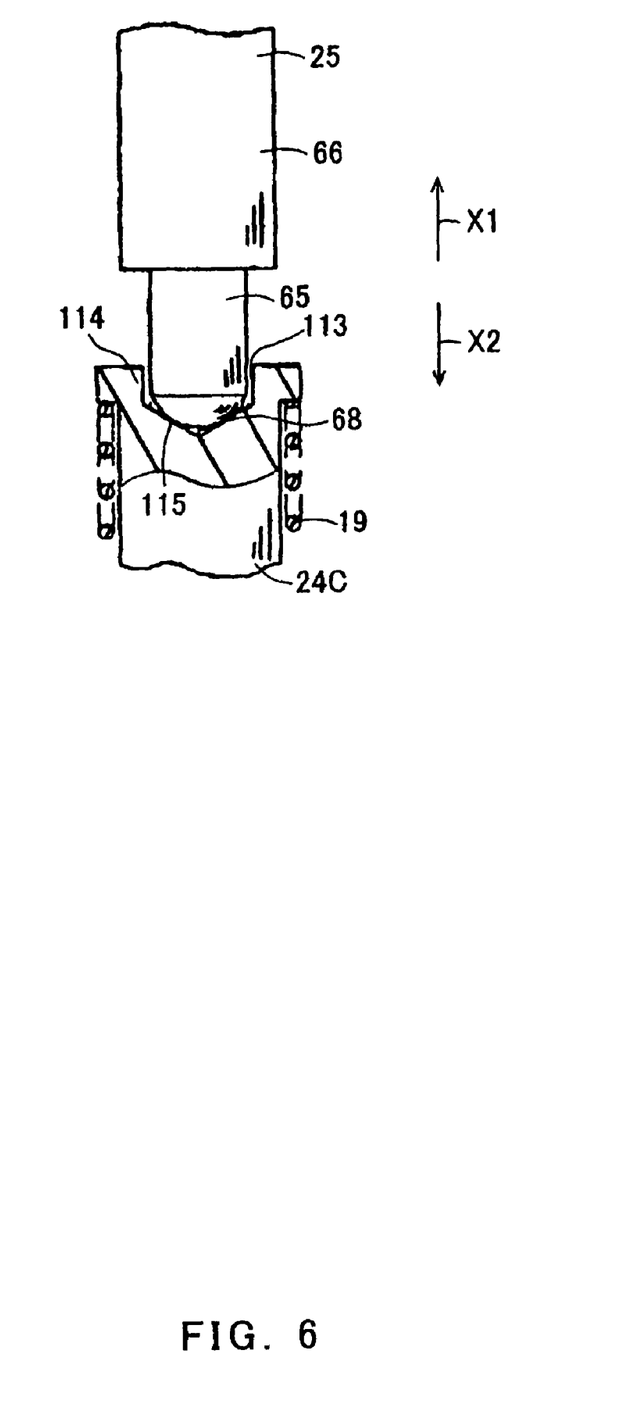
FIG. 6 is an enlarged cross-sectional view showing a region where the rod of the second embodiment is in contact with and supported by the base rod.

FIG. 6 is an enlarged cross-sectional view of a region where the rod 24C of the second embodiment is in contact with and supported by the base rod 25. A rod concave portion 113 is formed on second axial end portion 41C of the rod 24C to extend along the axis L1. The portion of the rod concave portion 113 is inclined radially inward in the second axial direction X2 to form a conical shape. The rod concave portion 113 is formed to fit thereinto a part of the first axial end portion of the base rod 25, to be precise, a part of the small-diameter portion 65. A support surface 68 of the base rod 25 is in contact with a tapered portion of a rod concave portion 114 forming the rod concave portion 113. The support surface 68 is formed in a partial spherical shape so that a contact surface 115 adapted to contact the rod concave portion 114 is of circular annular shape.

By thus forming the base rod 25 and the rod 24C, the contact surface 115 is of circular annular shape because the support surface 68 is of the partially spherical shape even in the case where the base rod 25 and the rod 24C are coaxial with low precision, for example, the axis of the base rod 25 is inclined with respect to the axis of the rod 24C. The contact surface pressure is applied from the contact surface 115 to the rod concave portion 114 in the direction perpendicular to the rod concave portion 114 and uniformly over the entire circumference. For this reason, the sum of radial component forces of the contact surface pressure over the entire circumference that are applied to the rod concave portion 114 becomes substantially zero, and the pressing force is applied from the contact surface 115 to the rod concave portion 114 in the second axial direction X2. This makes it possible to apply uniform contact surface pressure to the outer peripheral portion of the rod 24C over the entire circumference, suppressing uneven contact. Thereby, the non-uniform force applied in the circumferential direction to the rod 24C can be reduced, and hence the hysteresis difference of override characteristic of the pressure-reducing valve 20B can be reduced.

By suppressing the uneven contact of the rod 24C, the uniform contact surface pressure can be applied from the outer peripheral portion of the rod 24C to the inner peripheral portion of the pressure-reducing piston 22 over the entire circumference. This makes it possible to also suppress uneven contact of the pressure-reducing piston 22 with respect to the housing 21. By thus suppressing the uneven contact, uneven wear-out of the seal members 49, 52, and 56 provided at the rod 24 and the pressure-reducing piston 22 can be suppressed, and their lifetimes can be prolonged.

Figure 7:
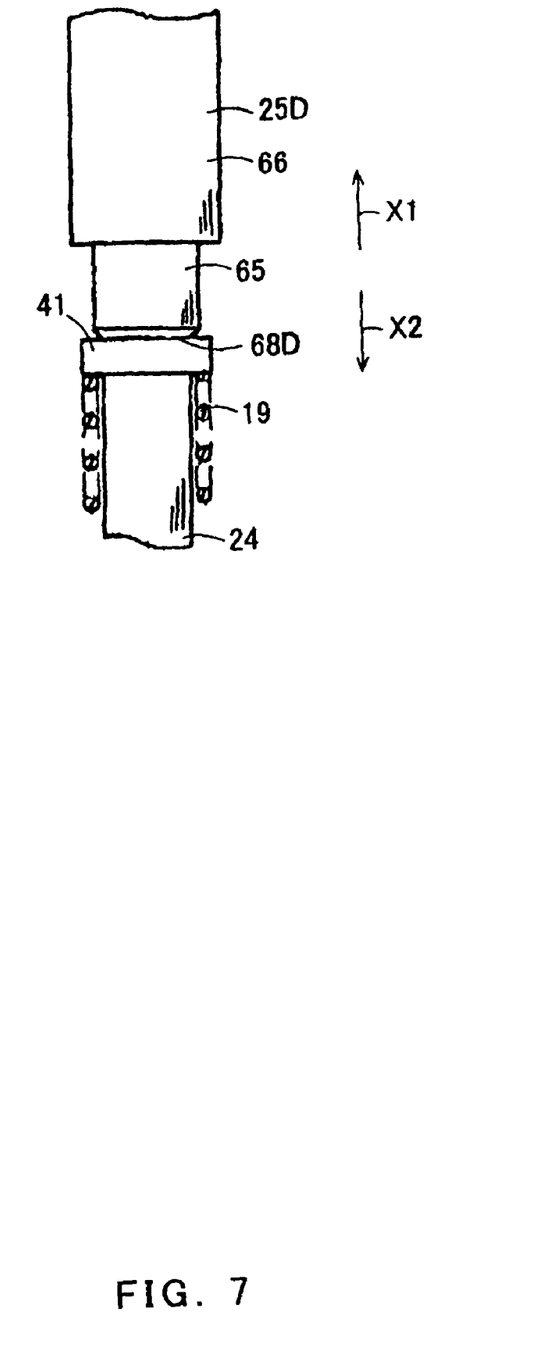
FIG. 7 is an enlarged cross-sectional view showing a region where the rod is in contact with and supported by a base rod of the second embodiment.

FIG. 7 is an enlarged cross-sectional view showing a region where the rod 24 is in contact with and supported by the base rod 25D of the second embodiment. The support surface 68D of the base rod 25D is formed to be flat. The rod 24 is supported by the base rod 25D in such a manner that the support surface 68D is in contact with the second axial end portion 41 of the rod 24 to apply a pressing force in the second axial direction X2 against the spring force exerted by the third spring member 19. By forming the support surface 68D to be flat, the base rod 25D can be easily manufactured without a complicated process. As a result, the pressure-reducing valve 20 can be manufactured at a reduced cost and in larger quantity. Furthermore, since the pressure-reducing valve 20 is configured to allow for a greater coaxial tolerance than in the prior art pressure-reducing valve 1, the hysteresis does not substantially occur in the pressure-reducing valve 20 even when the support surface 68 is thus flat.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A pressure-reducing valve comprising:
   a housing provided with a primary port and a secondary port;
   a pressure-reducing piston displaceably retained in an interior of the housing, the pressure-reducing piston being displaced to control an opening degree of the primary port and being configured to separate the interior of the housing into a primary-pressure space connected to the primary port and a secondary-pressure space connected to the secondary port;
   a driving piston displaceably retained in the interior of the housing, the driving piston being displaced to cause the pressure-reducing piston to be displaced in association therewith and having a secondary-pressure receiving surface that receives a secondary pressure from a fluid in the secondary-pressure space;
   a spring mechanism configured to exert a spring force against the secondary pressure to at least one of the pressure-reducing piston and the driving piston;
   a rod displaceably inserted into the pressure-reducing piston and being configured to form a back-pressure space kept at a primary pressure between the rod and the pressure-reducing piston with the rod inserted into the pressure-reducing piston; and
   a base rod retained in the housing, for applying a pressing force against the primary pressure applied to the rod to support the rod.

2. The pressure-reducing valve according to claim 1, wherein the base rod has a partial spherical support surface on which the rod is supported.

\* \* \* \* \*